US012255003B2

(12) United States Patent
Galletti et al.

(10) Patent No.: US 12,255,003 B2
(45) Date of Patent: Mar. 18, 2025

(54) RADIATOR FOR A TRANSFORMER HAVING IMPROVED COOLING

(71) Applicant: Hitachi Energy Ltd, Zürich (CH)

(72) Inventors: Bernardo Galletti, Nussbaumen (CH); Andreas Blaszczyk, Zurich (CH); Wei Wu, Raleigh, NC (US)

(73) Assignee: HITACHI ENERGY LTD, Zürich (CH)

( * ) Notice: Subject to any disclaimer, the term of this patent is extended or adjusted under 35 U.S.C. 154(b) by 1004 days.

(21) Appl. No.: 17/286,021

(22) PCT Filed: Oct. 2, 2019

(86) PCT No.: PCT/EP2019/076713

§ 371 (c)(1),
(2) Date: Apr. 16, 2021

(87) PCT Pub. No.: WO2020/078723

PCT Pub. Date: Apr. 23, 2020

(65) Prior Publication Data

US 2021/0383956 A1 Dec. 9, 2021

(30) Foreign Application Priority Data

Oct. 19, 2018 (EP) .................................... 18201588

(51) Int. Cl.
*H01F 27/14* (2006.01)
*H01F 27/02* (2006.01)

(52) U.S. Cl.
CPC ........... *H01F 27/14* (2013.01); *H01F 27/025* (2013.01)

(58) Field of Classification Search
CPC ........ H01F 27/14; H01F 27/025; H01F 27/22; H01F 27/08; H01F 27/10; H01F 27/105;
(Continued)

(56) References Cited

U.S. PATENT DOCUMENTS 3,452,147 A * 6/1969 Narbut .................... H01F 27/18 336/57
3,659,239 A 4/1972 Marton
(Continued)

FOREIGN PATENT DOCUMENTS

CN 201522913 U 7/2010
CN 201829303 U 5/2011
(Continued)

OTHER PUBLICATIONS

Notice of Reasons for Refusal for Japanese Patent Application No. 2021-520404, mailed Jul. 26, 2023, 3 pages.
(Continued)

*Primary Examiner* — Mang Tin Bik Lian
(74) *Attorney, Agent, or Firm* — Sage Patent Group

(57) ABSTRACT

Radiator for a transformer comprising a plurality of radiator panels with at least a first and a second radiator panel extending in a substantially vertical direction, wherein the first and the second radiator panel form an air duct providing a gap there-between having a width of smaller than 90 mm, and wherein a first radio panel bottom edge is located at a lower vertical height position than a second radiator panel bottom edge, wherein the first radiator panel is located at a side of the radiator panel such that the first radiator panel and a transformer side form a transformer air duct wherein the second radio panel bottom edge is located at a larger height than the first radio panel bottom edge and wherein the radiator panels have an aspect ratio greater than 8 of a depth of the radiator panel over a width of the air duct.

20 Claims, 6 Drawing Sheets

(58) Field of Classification Search
CPC ........ H01F 27/12; H01F 27/125; H01F 27/16; H01F 27/18; H01F 27/20
See application file for complete search history.

(56) References Cited

U.S. PATENT DOCUMENTS

| | | | | | |
|---|---|---|---|---|---|
| 5,252,778 | A * | 10/1993 | Ogawa | H01F 27/20 | 174/15.1 |
| 6,399,876 | B1 * | 6/2002 | Oakes | H01F 27/025 | 174/15.1 |
| 7,081,802 | B2 * | 7/2006 | Bonaquist | F28F 13/02 | 336/55 |
| 9,909,825 | B2 * | 3/2018 | Bercea | F28F 27/00 | |
| 2001/0032718 | A1 * | 10/2001 | Sheerin | F28F 1/16 | 165/130 |
| 2009/0180514 | A1 * | 7/2009 | Anderson | H01F 27/402 | 374/54 |
| 2015/0325358 | A1 * | 11/2015 | Peinbauer | H01F 27/14 | 165/104.33 |
| 2018/0270987 | A1 * | 9/2018 | Yuan | H05K 7/209 | |
| 2019/0027292 | A1 | 1/2019 | Findeisen | | |

FOREIGN PATENT DOCUMENTS

| | | | |
|---|---|---|---|
| CN | 102760555 | A | 10/2012 |
| CN | 203397833 | U | 1/2014 |
| CN | 203706791 | U | 7/2014 |
| DE | 102016200744 | A1 | 7/2017 |
| DE | 202017105786 | U1 | 11/2017 |
| EP | 0500390 | A1 | 8/1992 |
| FR | 2085609 | A2 | 12/1971 |
| GB | 631223 | A | 10/1949 |
| JP | S5696814 | A | 8/1981 |
| JP | S57183008 | A | 11/1982 |
| JP | 62-037910 | * | 3/1987 |
| JP | 6237910 | U | 3/1987 |
| JP | H0661385 | A | 3/1994 |
| JP | 2009081171 | A | 4/2009 |
| JP | 2010073707 | A | 4/2010 |
| JP | 2012044049 | A | 3/2012 |
| JP | 2012178612 | A | 9/2012 |

OTHER PUBLICATIONS

Notice of Reasons for Refusal, Japanese Patent Application No. 2021-520404, mailed Nov. 13, 2023, 13 pages.

Korean Notice of Allowance, Korean Application No. 10-2021-7010973, mailed Jul. 1, 2023, 4 pages.

International Search Report and Written Opinion for International Application No. PCT/EP2019/076713 dated Jan. 20, 2020, 15 pages.

First Office Action for Chinese Patent Application No. 201980068412X, mailed Aug. 4, 2023, 8 pages.

Decision of Refusal, Japanese Patent Application No. 2021-520404, mailed Apr. 11, 2024, 4 pages.

* cited by examiner

RADIATOR FOR A TRANSFORMER HAVING IMPROVED COOLING

CROSS REFERENCE TO RELATED APPLICATIONS

This application is a 35 U.S.C. § 371 national stage application of PCT International Application No. PCT/EP2019/076713 filed on Oct. 2, 2019, which in turns claims foreign priority to EP patent application Ser. No. 18/201,588.3, filed on Oct. 19, 2018, the disclosures and content of which are incorporated by reference herein in their entirety.

FIELD

Embodiments of the present disclosure relate to a radiator for a transformer and a transformer comprising at least one radiator.

BACKGROUND

Transformers dissipate energy and therefore typically need cooling. For example, oil transformers are cooled by radiator panels that allow the transformer oil to exchange energy with the surrounding environment. The radiator panels may be organized in radiators and mounted to a transformer.

In an oil-insulated transformer, here briefly called oil transformer, the windings and the yoke are placed in a tank filled with oil. The heat transported by the oil may usually be dissipated into the environment in one or more radiators placed outside of the tank. Each radiator may consist of an ensemble of several metallic panels through which e.g. the oil flows, which can be closely stacked to form an area of ducts where a buoyancy-driven airflow is established. The performance of the transformer may depend on and even be delimited by the cooling rate of the radiators.

Accordingly, there is a demand for a radiator for a transformer with an optimized cooling rate or cooling performance compared to the state of the art.

SUMMARY OF THE INVENTION

In light of the above, a radiator according to independent claim 1 and a transformer according to claim 14 is provided. Further aspects, advantages, and features are apparent from the dependent claims, the description, and the accompanying drawings.

According to an aspect of the invention, a radiator for a transformer is provided, the radiator comprising a plurality of radiator panels with at least a first and a second radiator panel. Additionally, the first and the second radiator panel extend in a substantially vertical direction, i.e. vertical at least in an erected or up-right or operational state of the transformer 1. Each radiator panel additionally has a bottom edge. The first and the second radiator panel form an air duct there-between (i.e. in-between them), the air duct having a width of smaller than 90 mm. The width of an air duct may refer to a measure or width in the y-direction. Moreover, the bottom edge of the first radiator panel is located at a smaller height than the bottom edge of the second radiator panel.

According to an aspect of the invention, a radiator for a transformer is provided. The radiator comprises a plurality of radiator panels with at least a first and a second radiator panel. Additionally, the first and the second radiator panel extend in a vertical direction or a substantially vertical direction. Each radiator panel of the radiator additionally has a bottom edge. The first and the second radiator panel form an air duct there-between (i.e. in-between them), the air duct having a width of smaller than 90 mm. The width of an air duct may refer to a measure in the y-direction. Moreover, the bottom edge of the first radiator panel is located at a smaller height than the bottom edge of the second radiator panel (i.e. is lower with respect to a height, a z-direction or an altitude) than the bottom edge of the second radiator panel. The first radiator panel is additionally located at a side of the radiator that is adapted or suitable to be attached to a transformer in such a manner that the first radiator panel and a side of the transformer form a transformer air duct. Further, the bottom edge of the second radiator panel is located at a larger vertical height (i.e. is higher with respect to a height, a z-direction or an altitude) than the bottom edge of the first radiator panel. Additionally, the radiator panels of the radiator have an aspect ratio greater than 8 of a depth of the radiator panels (i.e. a measure in the x-direction) over a width of the air duct, for example the air duct between the first and the second radiator panel. A transformer air duct may have a larger width than an air duct between radiator panels, i.e. the spacing between the transformer and the first radiator panel may be larger than a spacing between radiator panels. The aspect ratio refers to inter radiator panel air ducts.

Accordingly, the design and thus the cooling performance of the radiator of the present disclosure is improved, compared to conventional radiators. In particular, with the radiator described herein, an improved air flow through the air ducts and thus a higher or optimized cooling rate of a medium that enters and exits the radiator and thus the radiator panels can be provided.

According to a further aspect of the invention, a transformer is provided that comprises at least one radiator according to the aspect above. Accordingly, the transformer can be cooled in an improved manner.

BRIEF DESCRIPTION OF THE DRAWINGS

Embodiments of the invention are illustrated in the drawings and are described in more detail below. In the drawings.

DETAILED DESCRIPTION OF EMBODIMENTS AND GENERAL ASPECTS

Reference will now be made in detail to the various embodiments of the disclosure, one or more examples of which are illustrated in the figures. Within the following description of the drawings, the same reference numbers refer to same components. Generally, only the differences with respect to individual embodiments are described. Each example is provided by way of explanation of the disclosure is not meant as a limitation of the disclosure. Further, features illustrated or described as part of one embodiment can be used on or in conjunction with other embodiments to yield yet a further embodiment. It is intended that the description includes such modifications and variations.

Within the following description of the drawings, the same reference numbers refer to the same or to similar components. Generally, only the differences with respect to the individual embodiments are described. Unless specified otherwise, the description of a part or aspect in one embodiment can apply to a corresponding part or aspect in another embodiment as well.

Additionally, some general (i.e. optional) aspects of a radiator are described. These aspects can also be realized independently of the exemplary embodiment of the figures, in conjunction with any other aspects of the invention. Generally, any aspects described herein can be combined, independently of other details, with any other embodiment or aspect described herein.

For a better orientation, the drawings in the figures are supplemented with a respective Cartesian coordinate system with x, y referring to orthogonal horizontal directions and z referring to the vertical direction. Typically, the x-direction refers to a direction that is normal to the viewing plane of the figures. Typically, the (positive) y-direction refers to a direction normal to the radiator panel and/or the side of the transformer on which the radiator may be attached, for example a direction in the page plane that is perpendicular to the vertical direction. The coordinate system may have an origin on the ground or on a ground level, exemplary depicted in FIG. 1 with G.

Figure 1:
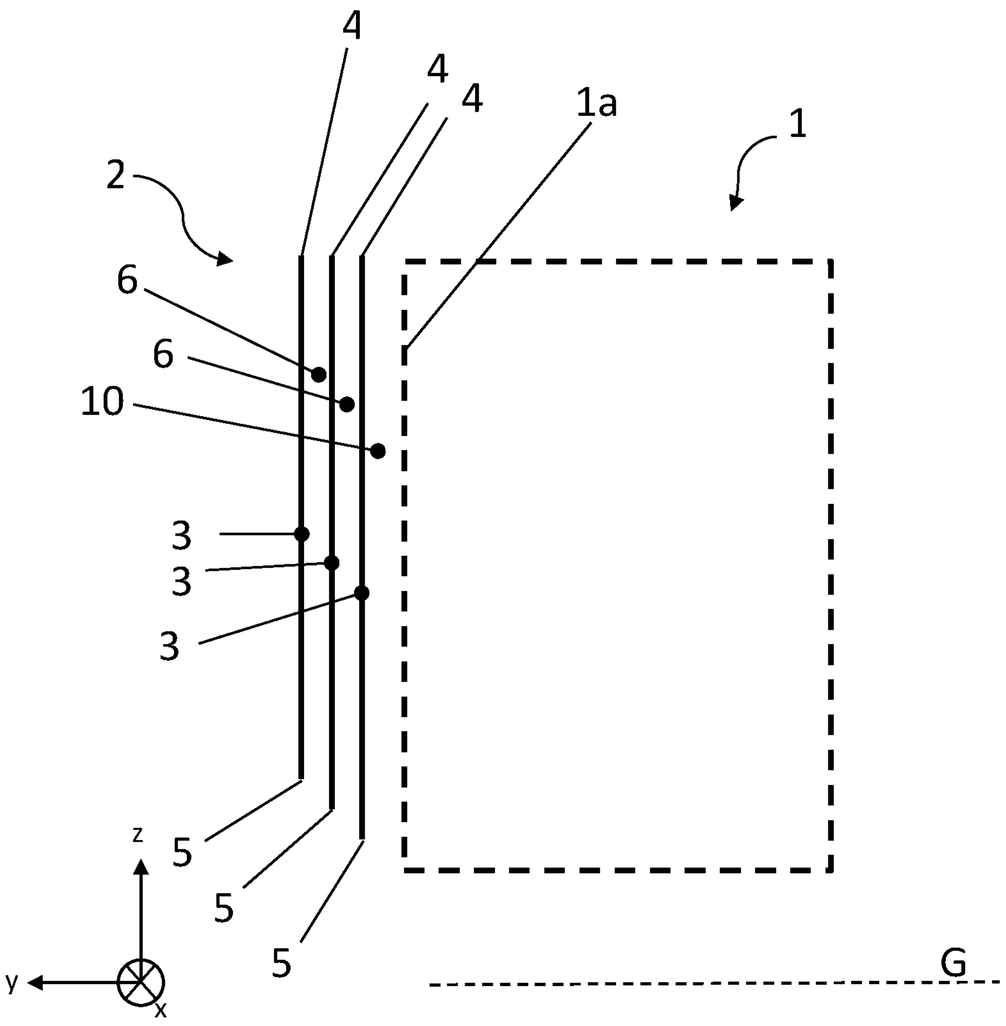
FIG. 1 shows a schematic side view of a radiator with multiple radiator panels and a transformer according to embodiments described herein.

With exemplary reference to FIG. 1, a transformer 1 according to the present disclosure is described. According to embodiments, which can be combined with other embodiments described herein, the transformer 1 comprises a radiator 2 that comprises radiator panels 3 that each have a radiator panel top edge 4 and a radiator panel bottom edge 5. The radiator panels 3 pairwise form an air duct 6 between the radiator panels 3.

During operation, the air adjacent to the radiator hot surfaces, and especially the air in the air duct 6, heats up and gets lighter and moves upwards. As a consequence, for the conservation of mass, new fresh air enters into the region adjacent to the radiator and into the air duct 6 from the side and at the radiator panel bottom edges 5.

Figure 6:
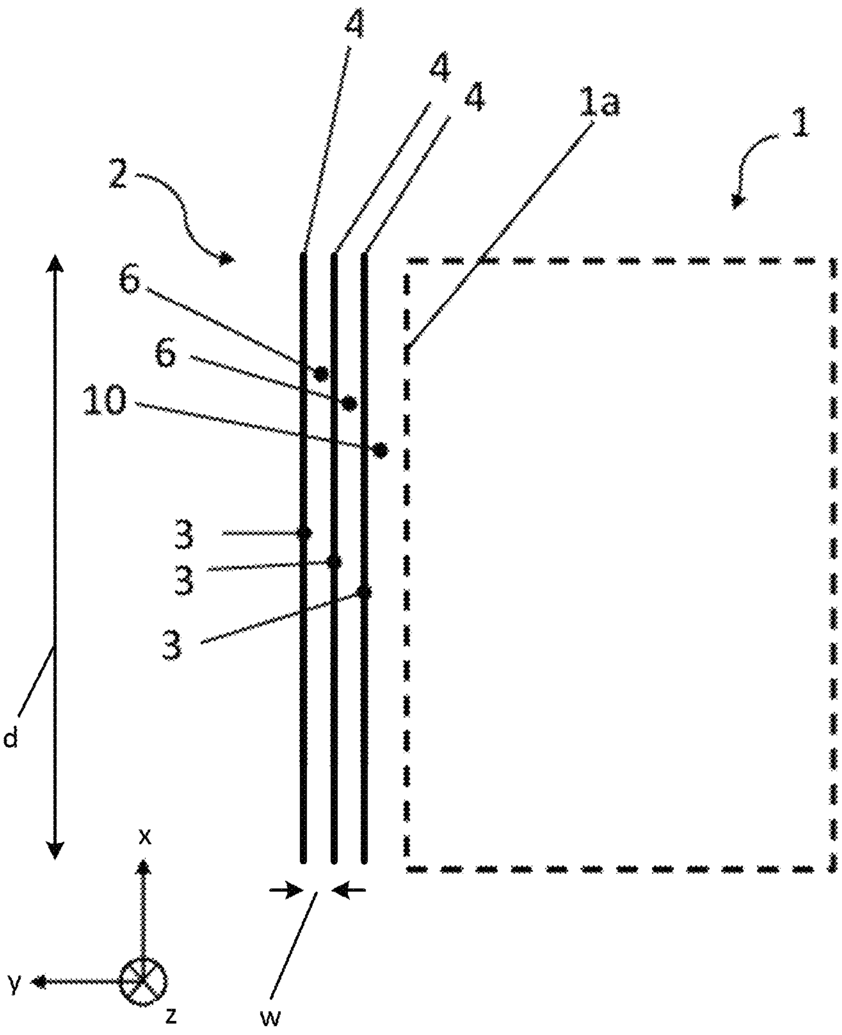
FIG. 6 shows a schematic top view of the radiator of FIG. 1 according to embodiments described herein.

With exemplary reference to FIG. 1, a transformer 1 according to the present disclosure is described. According to embodiments, which can be combined with other embodiments described herein, the transformer 1 comprises a radiator 2 that comprises radiator panels 3 that each have a radiator panel top edge 4 and a radiator panel bottom edge 5. The radiator panels 3 pairwise form an air duct 6 between the radiator panels 3. As shown in the top view of the transformer 1 of FIG. 6, an aspect ratio of a horizontal depth (d) of each radiator panel to the width (w) of each air duct is greater than 8, i.e., $d/w>8$, such that each radiator panel of the plurality of radiator panels has a horizontal depth (d) of at least 8 times the width (w) of the air duct.

Figure 2:
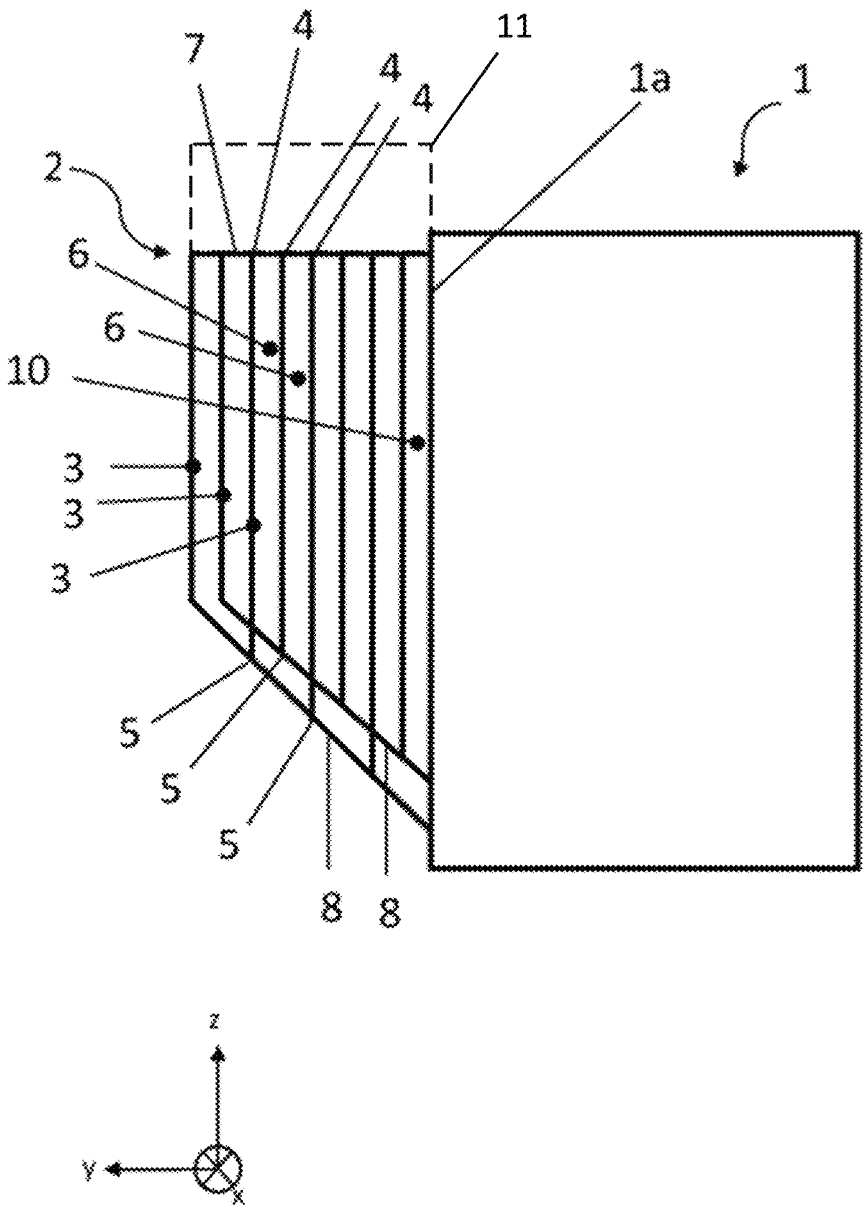
FIG. 2 shows a schematic side view of a transformer with a radiator that comprises radiator panels according to embodiments described herein.

With exemplary reference to FIG. 2, a transformer 1 according to the present disclosure is described. According to embodiments, FIG. 1 depicts an exemplary radiator 2 comprising three radiator panels 3. The radiator panels 3 are depicted in a side view. The radiator panels 3 extend in a substantially vertical direction. Each radiator panels 3 has a radiator panel top edge 4 located at an end of the radiator panel 3 that is highest in a vertical direction. Each radiator panel 3 has a radiator panel bottom edge 5 located at an end of the radiator panel that is lowest in a vertical direction. Two return ducts 8 are shown in exemplary FIG. 2 that connect the radiator panel bottom edges 5 of the radiator 2 with the transformer 1. According to some embodiments, which can be combined with other embodiments described herein, the radiator panel bottom edges of the radiator may be connected to the transformer via at least two return ducts, or additionally or alternatively with more than one return duct. A supply duct 7 is shown in exemplary FIG. 2 that connects the radiator panel top edges 4 of the radiator 2 with the transformer 1. According to some embodiments, which can be combined with other embodiments described herein, the radiator panel top edges of the radiator may be connected to the transformer via at least one supply duct, or additionally or alternatively with more than one supply duct. In this example, a chimney 11 is arranged on top of at least some of the radiator panels 3, including an outermost radiator panel wherein the outermost radiator panel is the radiator panel with a greatest distance to the transformer 1. In this example, the chimney 11 is arranged on top of at least 50% of the radiator panels 3.

Figure 3:
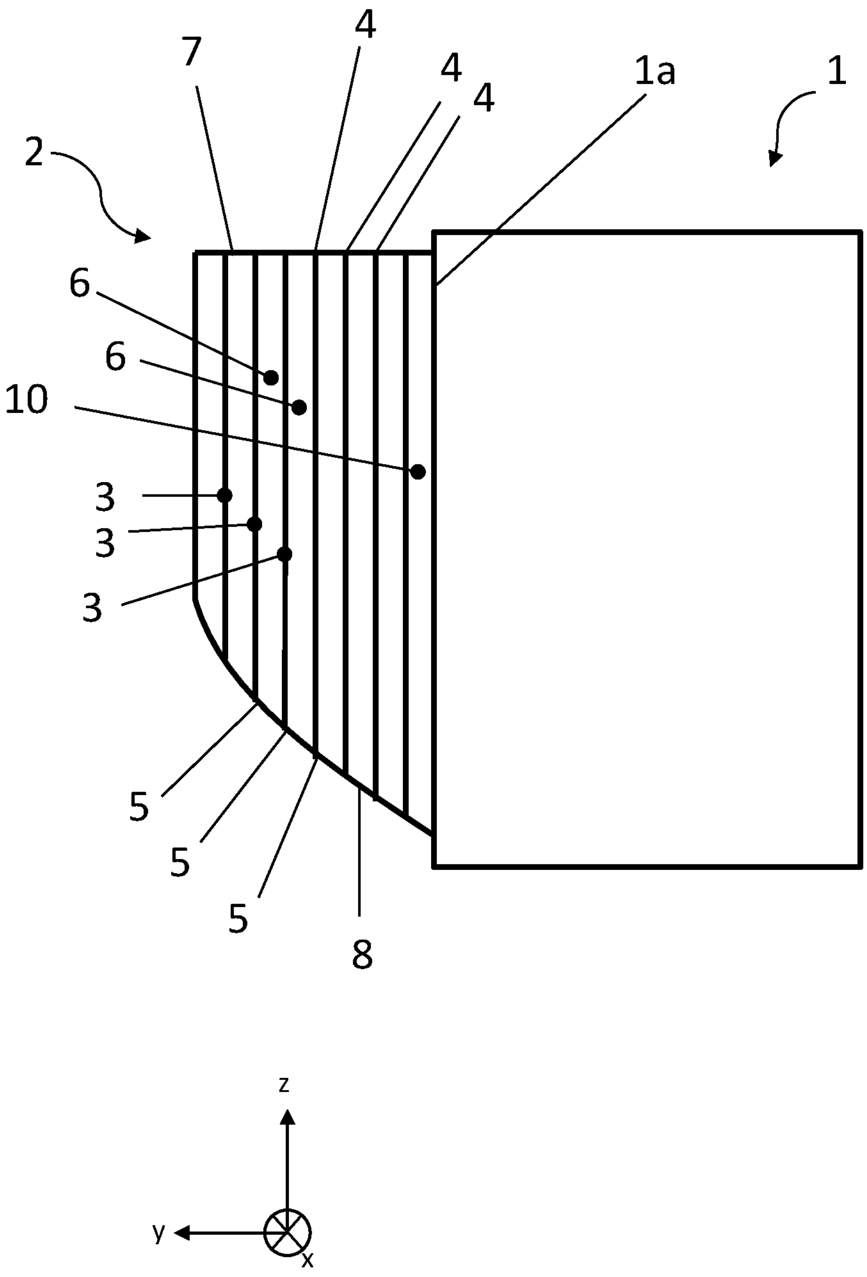
FIG. 3 shows a schematic side view of a transformer with a radiator that comprises radiator panels according to embodiments described herein.

With exemplary reference to FIG. 3, a transformer 1 according to the present disclosure is described. According to embodiments, FIG. 3 depicts an exemplary radiator 2 comprising radiator panels 3. The radiator panels 3 are arranged such that the radiator bottom edges 5 of the radiator panels 3 form a line, in a side view of the transformer 1 that is in average ascending with an increasing distance from the transformer main body or side wall 1*a* of the transformer 1. The radiator panels 3 extend in a direction and plane normal to the figure plane. The radiator 2 comprises radiator panels 3 that have radiator panel top edges 4 that are substantially at the same height. In the exemplary embodiment of FIG. 3, the radiator bottom edges 5 form a convex line of radiator bottom edges 5 (e.g. when seen from inside a virtual body formed by the stack of radiator panels 3) at different heights of the radiator panel bottom edges 5 in a vertical direction with increasing distances from the side wall 1*a* of the transformer 1. With this shape, an improved entry of air flow and thus improved air flow through the air ducts 6 may be achieved. This may increase the cooling capacity of the radiator 2.

Figure 4:
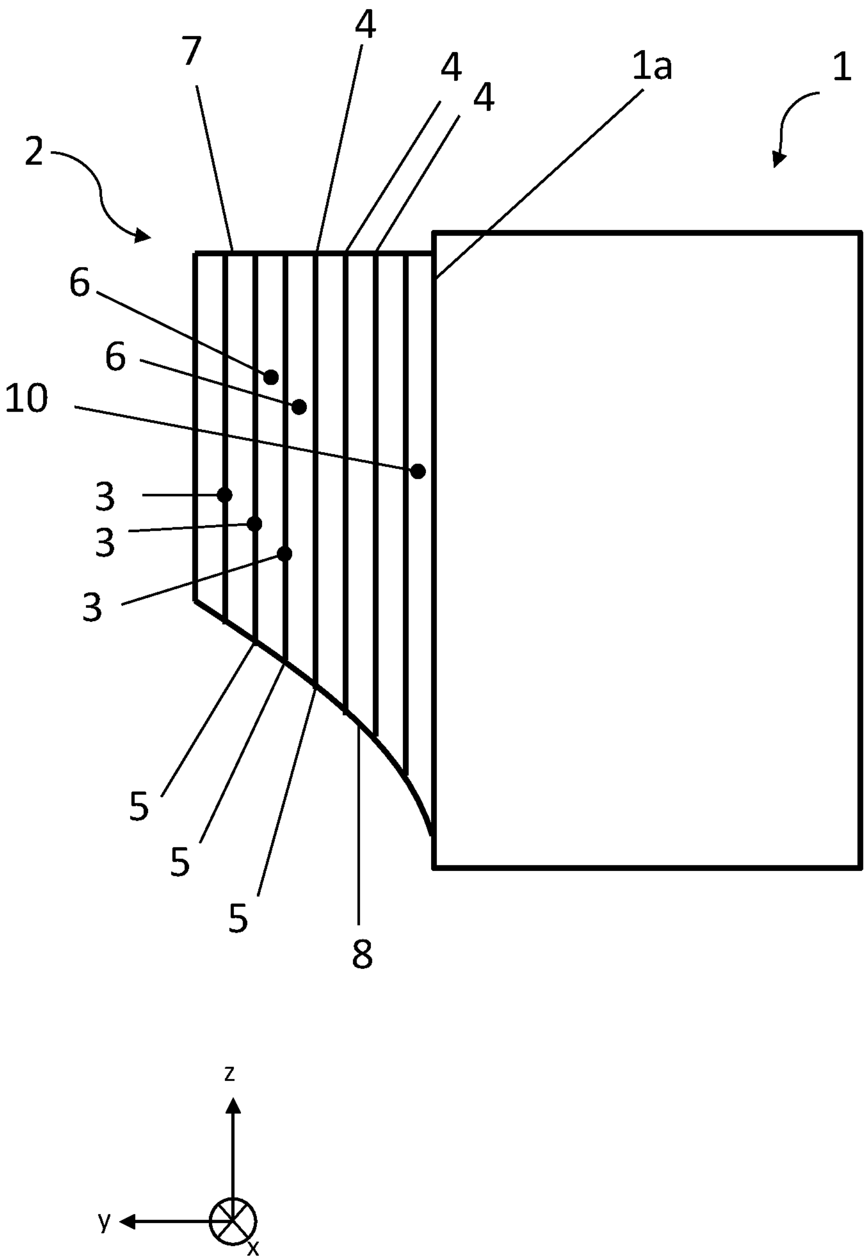
FIG. 4 shows a schematic side view of a radiator with radiator panels and a transformer according to embodiments described herein.

With exemplary reference to FIG. 4, a transformer 1 according to the present disclosure is described. According to embodiments, FIG. 4 depicts an exemplary radiator 2 comprising radiator panels 3. The radiator panels 3 are arranged such that the radiator panel bottom edges 5 substantially form a line that is in average monotonically ascending with a distance from the transformer main body of the transformer 1. The exemplary line in FIG. 4 forms a concave line of radiator panel bottom edges 5 (e.g. when seen from inside a virtual body formed by the stack of radiator panels 3). With this shape, an improved flow of air through the air ducts 6 may be achieved. This may increase the cooling capacity of the radiator 2. The radiator panel top edges 4 are exemplarily located at substantially the same height in a vertical direction.

Figure 5:
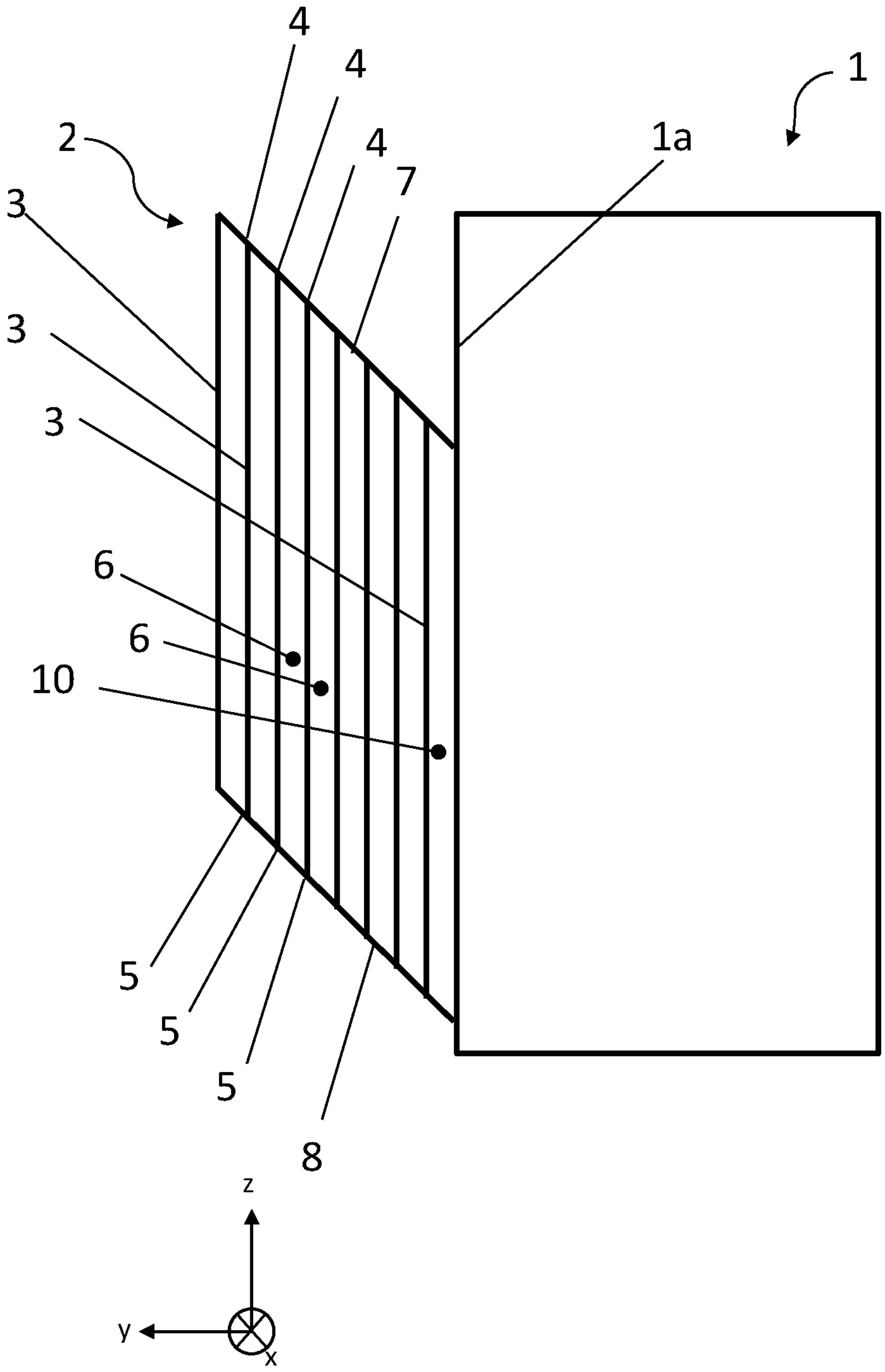
FIG. 5 shows a schematic side view of a radiator with radiator panels and a transformer according to embodiments described herein.

With exemplary reference to FIG. 5, a transformer 1 according to the present disclosure is described. According to embodiments, FIG. 5 depicts an exemplary radiator 2 comprising radiator panels 3. The radiator panels 3 are mounted to the transformer main body or to the side wall 1*a* of the transformer such that the radiator panel bottom edges 5 form a straight line that is ascending with increasing distance from the transformer main body or side wall 1*a* of the transformer 1. The radiator panel top edges 4 in the exemplary embodiment of FIG. 5 form a line that is monotonically ascending with the distance from the transformer main body or side wall 1*a* of the transformer 1. The radiator panel top edges 4 form a line that is substantially equally aligned or tilted as the line of the radiator panel bottom edges 5 in a direction that points away from the transformer 1 or its wall 1*a*, respectively.

In particular, it is to be understood that according to embodiments which can be combined with other embodiments described herein, the radiator comprises a first radiator panel located in a mounted state closer to the transformer than a second radiator panel, wherein the bottom edge of the second radiator panel is located at a greater height than the bottom edge of the first radiator panel. Further in this application, the bottom edge of the first radiator panel and the second radiator panel are referred to as radiator panel bottom edges.

Generally, terms such as "closer to the transformer", "vertical", and the like refer to the radiator with the respective radiator panels being attached to the transformer and being placed and oriented in an operational state. According to an aspect, the radiator has an attachment section adapted for attaching the radiator panel to the transformer. The attachment section may include, for example, a mounting flange for mounting the radiator to the transformer. The attachment section defines a spatial relation between the radiator and the transformer.

According to an aspect, the attachment section includes an oil inlet line for letting transformer oil to the radiator panel for being cooled by the radiator panel, and an oil return line for returning the cooled oil to the transformer. The oil inlet line is typically placed at a higher vertical position than the oil return line. According to an aspect, the radiator panels are connected between the oil inlet line and the oil return line, so that oil from the oil inlet line is fed to the radiator panels, e.g., in parallel, and after having traversed the radiator panels is fed to the oil return line.

According to some embodiments, which can be combined with other embodiments described herein, the radiator comprises at least three consecutive radiator panels comprising the first and the second radiator panel.

According to some embodiments, which can be combined with other embodiments described herein, the radiator, when the radiator is attached to the transformer, the first radiator panel and a side of the transformer form a transformer air duct. The radiator is adapted to be attached to a transformer in such a manner that a transformer air duct is formed between the radiator and the transformer, i.e. the side of the transformer that the radiator is attached to/on.

According to some embodiments, which can be combined with other embodiments described herein, the radiator comprises radiator panel bottom edges, wherein the radiator panel bottom edges of the at least three consecutive radiator panels form a line that is in average monotonically ascending with the distance of the radiator panels from the transformer and/or with respect to the horizontal in a direction from the first radiator panel to the second radiator panel, the at least three consecutive radiator panels comprising the first and the second radiator panel.

The term "form a line" in this application is to be understood as a theoretical fitting of a line to the radiator panel bottom edges in a side view of the radiator (e.g., with a side view from a side orthogonal to planes defined by the radiator panels, along a horizontal viewing direction and/or along a direction parallel to the bottom edges). The line may be a best fit line. The line may be a best fit line that minimizes the deviation from the radiator panel bottom edges with respect to e.g. a least squares norm (algebraic or geometric method). The line may start or end at the horizontal location of a first radiator panel bottom edge and end at the horizontal location of a radiator panel bottom edge that is different from the first radiator panel bottom edge. The line may start or end at the horizontal location of the radiator panel bottom edge that is located closest to the transformer main body of the transformer. The line may end or start at the horizontal location of the radiator panel bottom edge that has the greatest distance to the transformer. "A line" in the sense of this application can be a best fit line that may be described with a mathematical equation. The mathematical equation may be a polynomial of first degree, or second degree, or third degree, or nth degree. Alternatively, the radiator bottom edges may lie on the line, up to a deviation of at most the horizontal distance between neighboring radiator panels.

According to some embodiments, which can be combined with other embodiments described herein, forming a line that is in average monotonically ascending is met for at least three, at least five, at least ten, or at least 18 consecutive radiator panels. Additionally or alternatively the above feature is met for at least the three, at least the five, at least the ten or at least the 18 closest radiator panels to a transformer main body of the transformer.

According to some embodiments, which can be combined with other embodiments described herein, the radiator comprises radiator panels, wherein the radiator panel bottom edges of the at least three, at least five, at least ten, or at least 18 consecutive radiator panels form a straight line that is monotonically ascending with the distance from the transformer and/or with respect to the horizontal in a direction from the first radiator panel to the second radiator panel.

Additionally or alternatively wherein the radiator panel bottom edges of the at least 30% of all radiator panels, at least 50% of all radiator panels, at least 80% of all radiator panels, or at least all radiator panels that may be consecutive radiator panels form a straight line that is monotonically ascending with the distance from the transformer.

According to some embodiments, which can be combined with other embodiments described herein, the radiator comprises radiator panels, wherein the height of the radiator panel bottom edges increases monotonically, preferably strict monotonically with the distance to the transformer for at least the last three, or the last five, or the last ten, or the last 18 radiator panels, or strictly monotonically for all radiator panels. The last radiator panels may be the radiator panels with the greatest distance to the transformer, e.g. the greatest distance in a y-direction.

According to some embodiments, which can be combined with other embodiments described herein, the radiator panel top edges are located at substantially the same height. Substantially the same height may be up to 5% of the height of the tallest radiator panel.

According to some embodiments, which can be combined with other embodiments described herein, the radiator panel top edges are located at substantially different heights. Substantially different heights are understood as different heights with a deviation in the heights of more than 5%, more than 10%, more than 20%, or more than 30% of the height of the tallest radiator panel. Additionally or alternatively, less than 95%, less than 80%, less than 60%, or less than 20% of the height of the tallest radiator panel is considered to be substantially at different heights.

According to some embodiments, which can be combined with other embodiments described herein, the radiator panel that is located closest to the transformer is substantially equal to the height of the transformer.

A radiator panel having a height that is substantially equal to the height of the transformer is understood as equal to the height of the transformer, wherein a deviation of up to −50%, or up to −40%, or up to −30%, or up to −15%, or up to −10% of the height of the transformer from exact equality of the height is still considered substantially equal. Additionally or alternatively, less than +10%; or less than +8%, or less than +5% of the transformer height is still considered substantially equal to the height of the transformer.

According to some embodiments, which can be combined with other embodiments described herein, the radiator may have radiator bottom edges enclosing an inclined angle relative to the horizontal that is substantially equal to at least 10° or wherein the radiator panel bottom edges form a line that is substantially inclined at at least 10° to the horizontal in a direction away from the transformer.

According to some embodiments, which can be combined with other embodiments described herein, the radiator may have radiator bottom edges that form an inclined angle relative to the horizontal that is at least 10°, or wherein the radiator panel bottom edges form a line that is substantially inclined at an angle of at least 10° to the horizontal in a direction from the first radiator panel to the second radiator panel.

The angle may be substantially equal to 10°, or substantially equal to 30°, or substantially equal to 50°. Additionally or alternatively the angle may be substantially less than 50°. Additionally or alternatively the angle may be substantially more than 10°. The angle may refer to an angle between a line that is formed by the radiator panel bottom edges and a horizontal.

According to some embodiments, which can be combined with other embodiments described herein, the radiator comprises a chimney arranged on top of at least some of the radiator panels.

According to some embodiment, which can be combined with other embodiments described herein, a depth of a radiator panel and a width of an air duct may have an aspect ratio of larger than 9. A radiator panel may have a depth of substantially 520 mm and an air duct may have a width of substantially 45 mm. The resulting aspect ratio is about 11.5.

According to some embodiments, which can be combined with other embodiments described herein, an aspect ratio of a depth of a radiator panel and a width of an air duct may be greater than 9, or greater than 11, or greater than 15, or greater than 20. Additionally or alternatively, an aspect ratio of a depth of a radiator panel and a width of an air duct may be greater than 9 and smaller than 30.

According to some embodiments, which can be combined with other embodiments described herein, the radiator panels may have an aspect ratio of a height of the radiator panel over a width of the radiator panel of more than 50, additionally or alternatively, of less than 800.

According to some embodiments, which can be combined with other embodiments described herein, a radiator panel may have an aspect ratio of a depth of the radiator panel over a width of the radiator panel of more than 15, additionally or alternatively of less than 140.

According to some embodiments, which can be combined with other embodiments described herein, the radiator may have an oil inlet that is connected to the radiator panels of the radiator from above the radiator, for example through a top edge of the radiator. The radiator may have an oil outlet that is connected to the radiator panels of the radiator from below the radiator panels, for example through a bottom edge. The radiator panels may be in fluid connection with the oil inlet and the oil outlet, for example through dedicated and/or suitable connectors in the top edges and the bottom edges of the radiator panels. The oil inlet or the oil outlet may not be connected through a side surface of the radiator panel, e.g. a surface in the x-direction and/or the y-direction. The oil inlet may be located partially above the radiator panels and/or the oil outlet may be partially located below the radiator panels. The oil inlet may be a pipe that is in fluid connection with the radiator panels that is at least partially located above the radiator panels. The oil outlet may be a pipe that is in fluid connection with the radiator panels that is at least partially located below the radiator panels.

"Away from the transformer" or "direction away" as used herein, may refer to a direction that is normal to a surface of the transformer, particularly a side of the transformer, pointing to the surrounding of the transformer. It may further mean, when referring to radiator panels that are mounted (or connected) to a transformer as (one of) radiator(s) of the transformer that the radiator panels are mounted (or attached) to the transformer with their largest surface area or side being parallel to a side of the transformer. "Away from the transformer" may refer to the positive y-direction.

An "increasing distance" of the radiator panels from a side wall of the transformer refers to a distance that comprises, for example, the width of an air duct between a side wall of the transformer and the first radiator panel of a radiator attached to the side of the transformer and the width of the first radiator panel. The distance from the side wall of the transformer increases for the second radiator panel of the radiator attached to the side of the transformer by, for example, the air duct between the first radiator panel and the second radiator panel and the width of the second radiator panel. Considering bottom edges or top edges of the individual radiator panels in the radiator, a top or bottom edge of a radiator panel at a position y in the radiator may be located at a distance that comprises the combined width of all air ducts between the side wall of the transformer and the radiator panel at position y and the widths of all radiator panels in between the side wall of the transformer and the radiator panel at position y of the radiator. This may be referred to as an increasing distance from the side wall of the transformer depending on the radiator panel or the radiator panel top or bottom edge that one may refer to.

"A lower vertical height position" as used herein, may refer to a position with a smaller z-coordinate or to an arbitrary distance to the ground that is smaller than another vertical height position. "A larger vertical height position" as used herein, may refer to a position with a bigger z-coordinate in comparison to another vertical height position. It may further refer to a distance from the ground that is bigger than the distance of another object, for example a bottom edge of another radiator panel. "A larger vertical height position" may also refer to a height, for example above ground, or an altitude.

According to some embodiments, which can be combined with other embodiments described herein, the radiator comprises a chimney arranged on top of at least some of the air ducts formed between the plurality of radiator panels and/or the transformer air duct of the at least one radiator panel and the transformer main body of the transformer. The chimney may advantageously be attached directly to the radiator panels, so that both the air ducts between the radiator panels and the chimney extend in the vertical direction.

According to some embodiments, which can be combined with other embodiments described herein, the height of the at least one chimney is greater than 100 mm, or greater than 500 mm, or greater than 1000 mm, or greater than 2000 mm. Additionally or alternatively, the height of the at least one chimney is smaller than 4000 mm, or smaller than 3000 mm, or smaller than 2500 mm.

According to some embodiments, which can be combined with other embodiments described herein, the chimney is in fluid connection with the air ducts and/or the transformer air duct, on top of which the chimney is arranged. Thereby, the air ducts may further contribute to and enhance the chimney effect.

According to some embodiments, which can be combined with other embodiments described herein, the chimney is arranged on top of at least some of the radiator panels comprising an outermost radiator panel, wherein the outermost radiator panel is the radiator panel with the greatest distance to the transformer main body or side wall of the transformer or the transformer.

According to some embodiments, which can be combined with other embodiments described herein, the chimney is arranged on top of at least some of the air ducts comprising an outermost air duct. The outermost air duct is the air duct formed between the outermost radiator panel, wherein the outermost radiator panel is the radiator panel with the greatest distance to the transformer main body or side wall of the transformer and the adjacent radiator panel with the second greatest distance to the transformer main body or side wall.

According to some embodiments, which can be combined with other embodiments described herein, the chimney is arranged on top of at least 50% of the radiator panels, preferably on top of at least 60%, or on top of at least two thirds of all radiator panels of the radiator, or on top of at least 60% of all air ducts of the radiator.

According to some embodiments, which can be combined with other embodiments described herein, the transformer is an oil-filled transformer and the radiator comprises an oil supply duct for supplying oil to be cooled from the transformer to the radiator and an oil return duct for returning cooled oil from the radiator to the transformer. The radiator may have at least two oil supply ducts and/or at least two oil return ducts, additionally or alternatively, the radiator may have more than one oil supply duct and/or more than one oil return duct connected to the transformer.

A distance between a first and a second radiator panel is substantially smaller than the width of a radiator in a mounting direction of the radiator on a transformer.

Radiator panel top edges may form a line that is substantially equal to the line of the radiator panel bottom edges in a direction that points away from the transformer.

The radiator panels may each have an oil supply. The radiator panels may each have an oil outlet. Furthermore, the radiator panels may be connected to a heat exchanger section. The radiator panels may have at least one oil supply connected. The radiator panels may have at least one oil outlet. The radiator may have at least one oil supply that is connected to the radiator panels of the radiator. The radiator may have at least one oil outlet that is connected to the radiator panels of the radiator. The oil supply and/or the oil outlet may be connected to a heat exchanger section.

The oil supply may connect the transformer with the radiator panels of the radiator in parallel and/or in series. There may be multiple oil connections to the radiator panels of the radiator.

The radiator panels of the radiator may be substantially formed as plate-like structures that extend in a vertical direction. Thus, the plate-like radiator panels may define respective planes, the respective planes including the vertical direction. The plate-like radiator panels may be parallel to each other (the parallel planes including the vertical direction). The vertical direction is, according to aspects, the direction in which the air duct(s) between the radiator panels extend for allowing the cooling air to flow therethrough, and/or the direction of oil ducts within the radiator panels allowing the transformer oil to flow therethrough, thereby being cooled while traversing the radiator panels.

Additionally or alternatively, the radiator panels of the radiator may extend in a direction normal to a viewing direction, when viewed from the side.

The number of radiator panels of a radiator may be more than three, more than five, more than ten, more than 15, or more than 18. Additionally or alternatively, the number of radiator panels of a radiator may be less than 30, less than 25, or less than 20 radiator panels.

The radiator panels may be metal panels. The radiator panels may have a height of more than 1000 mm, more than 1500 mm, or more than 2000 mm. The height may be less than 4000 mm or less than 3000 mm. Additionally or alternatively, the radiator panels may have a width of substantially equal to 11.9 mm, or additionally or alternatively more than 5 mm, more than 7 mm, or more than 10 mm. Additionally or alternatively, the radiator panels may have a width smaller than 20 mm, smaller than 15 mm, or smaller than 12 mm.

The radiator panels may have a depth of substantially equal to 520 mm, or additionally or alternatively more than 300 mm, more than 400 mm, or more than 500 mm, or additionally or alternatively less than 700 mm, less than 600 mm, or less than 550 mm. The depth may refer to a measure in the x-direction.

The radiator panels may be comprised in a radiator panel casing. The radiator panel casing may be made of metal such as e.g. aluminum, steel, or any other metal. The radiator panel casing may be made of a material suitable to withstand the temperature of the medium flowing in and out of the radiator panel.

Radiators and thus radiator panels can be mounted to the transformer main body or side wall of the transformer in horizontally stacked directions and/or horizontal directions.

According to some embodiments, which can be combined with other embodiments described herein, the transformer comprises at least one radiator.

According to some embodiments, which can be combined with other embodiments described herein, the transformer is an oil filled transformer.

According to some embodiments, which can be combined with other embodiments described herein, windings and the yoke of the transformer are placed in a tank filled with oil. More specifically, the oil may serve two purposes. It may allow to reduce the size of the transformer since it has a high dielectric strength. It removes the heat from the hot surfaces by free or forced convection.

According to some embodiments, which can be combined with other embodiments described herein, the heat is dissipated into the environment in one or more radiators placed outside of the tank.

According to some embodiments, which can be combined with other embodiments described herein, each radiator comprises one or more radiator panels. The radiator panels may be metallic panels through which the oil flows. The radiator panels may be closely stacked to from an array of ducts. The ducts may allow for a buoyancy-driven air flow to be established there-between. The driving force that gets the oil to circulate through the one or more radiators may be gravity and/or at least one hydraulic pump. The heat may be removed by the buoyant air flow that cools the radiator panels' outside surfaces. Accordingly, beneficially the cooling capacity of the radiator can be increased.

The term "vertical direction" or "vertical orientation" is understood to distinguish over "horizontal direction" or "horizontal orientation". That is, the "vertical direction" or "vertical orientation" relates to a substantially vertical orientation e.g. of the radiator panels or the radiator or the transformer (when erected for regular operation), wherein a deviation of a few degrees, e.g. up to 10°, up to 15°, or even up to 45°, from an exact vertical direction or vertical orientation is still considered as a "substantially vertical direction" or a "substantially vertical orientation". The vertical direction can be substantially parallel to the force of gravity. Accordingly, "horizontal direction" or "horizontal orientation" relates to an orientation substantially perpendicular to the "vertical direction" or "vertical orientation". In particular, the term "substantially vertical (or horizontal)" includes the case of "vertical (or horizontal)" and "exactly vertical (or horizontal)". "A vertical direction" as used herein may refer to the local gravity-direction or the opposite local gravity-direction.

Exemplary Embodiment which Can Be Combined with Other Embodiments Described Herein In an exemplary embodiment, a transformer is provided that may have the following parameters. The transformer may be provided for medium or large voltages (for at least one of the terminal pairs to have rated voltages of at least 1 kV, preferably of at least 52 kV). The transformer may operate at more than 10 MVA, or more than 20 MVA or more than 30 MVA, additionally or alternatively, the transformer may operate at less than 60 MVA. The transformer may have more than 5 radiator banks on each side (in total more than 10 radiator banks, e.g. on two opposing side walls of the transformer). The transformer may have a cooling capacity of more than 150 kW, or more than 180 kW. The oil may be in fluid connection with more than 10 radiator banks. At least some of the radiator banks may be more than 1500 mm or more than 2000 mm tall in height (e.g. in a vertical direction), additionally or alternatively more than 8 mm, or more than 10 mm wide and additionally or alternatively may be more than 300 mm, or more than 400 mm deep. The radiator panel casings may be made of aluminum and may be less than 4 mm thick, additionally or alternatively more than 0.5 mm thick. The oil channel width inside the radiator panels may therefore be more than 0.5 mm, or additionally or alternatively less than 9 mm. During normal operation, the temperature of the oil at the inlet of each duct may be more than 50° C., or more than 60° C., additionally or alternatively less than 100° C., or less than 90° C. The heat may be transferred from the oil through the radiator panel casings into the surrounding ambient air. The heat transfer may set the oil in motion due to buoyancy effect.

The oil-filled transformer (the radiator panels) may have ducts having a respective width h, where h is more than 6 mm, or more than 8 mm, additionally or alternatively less than 13 mm. The airflow may be laminar and/or turbulent within the air ducts.

The cooling performance of the radiator banks is expressed in terms of cooling capacity, i.e. the overall heat power removed from the oil flowing in the radiators, defined as:

$$\dot{Q}_c = \dot{m} c_{oil} (\overline{T}_o - T_i)$$

wherein $\dot{m}$ is the overall oil mass flow rate, $c_{oil}$ is the oil specific heat, $T_i$ is the oil temperature at the ducts' inlets and $\overline{T}_o$ is the mass-averaged oil temperature at the ducts' outlets.

The airflow decreases from the innermost air ducts to the outermost air ducts. An outermost air duct is an air duct with the largest distance from the transformer. In other words, an outermost air duct is an air duct with the largest horizontal distance from the side wall of the transformer. The oil cooling thus worsens in the outermost radiator panels.

The inventors have found that in the state of the art, an airflow separation from the outermost air ducts is possible. This may create an air bubble of stagnant air at the radiator panel bottom edges of the outermost radiator panels. The stagnant air bubble may be detrimental for the cooling capacity of the radiator.

Further evidence of this effect may be seen in the publication of B. Galletti, A. Blaszczyk and W. Wu, "Improvement of Cooling Performance of Transformer Radiator Banks Based on CFD Simulations", submitted to Advanced Research Workshop on Transformers, Cordoba, October 2019.

The present invention may solve the problem of the state of the art. The inventors have found that embodiments of the invention have a cooling capacity that is 10% to 40% higher than the state of the art configurations.

While the foregoing is directed to the embodiments, other and further embodiments may be devised without departing from the basic scope, and the scope is determined by the claims that follow.

The invention claimed is:

1. Radiator for a transformer, the radiator comprising a plurality of radiator panels with at least a first radiator panel and a second radiator panel, the first and the second radiator panels extending in a substantially vertical direction, and each of the plurality of radiator panels having a bottom edge, the first and the second radiator panels forming an air duct providing a gap there-between having a width of smaller than 90 mm, and the bottom edge of the first radiator panel being located at a lower vertical height position than the bottom edge of the second radiator panel;

the first radiator panel being located at a side of the radiator that is adapted to be attached to a transformer in such a manner that the first radiator panel and a side of the transformer form a transformer air duct; and each radiator panel of the plurality of radiator panels having a horizontal depth of at least 8 times the width of the air duct.

2. The radiator of claim 1, wherein, when the radiator is attached to the transformer, the first radiator panel and a side of the transformer form a transformer air duct.

3. The radiator of claim 1, wherein the radiator panel bottom edges of at least three consecutive radiator panels form a line that is in average monotonically ascending with respect to a horizontal in a direction from the first radiator panel to the second radiator panel, the at least three consecutive radiator panels comprising the first and the second radiator panels.

4. The radiator of claim 3, wherein the radiator panel bottom edges of the at least three consecutive radiator panels form a straight line that is monotonically ascending with respect to the horizontal in a direction from the first radiator panel to the second radiator panel.

5. The radiator of claim 1, wherein the vertical height position of the radiator panel bottom edges increases monotonically with respect to a horizontal in a direction from the first radiator panel to the second radiator panel.

6. The radiator of claim 1, wherein the radiator panel top edges are located at substantially a same vertical height position.

7. The radiator of claim 1, wherein the radiator bottom edges form an inclined angle relative to a horizontal that is at least 10°, or wherein the radiator panel bottom edges form a line that is substantially inclined at an angle of at least 10° to the horizontal in a direction from the first radiator panel to the second radiator panel.

8. The radiator of claim 1, wherein the radiator panels of the radiator are substantially formed as plate-like structures that extend in a vertical direction.

9. The radiator of claim 1, wherein a chimney is arranged on top of at least some of the radiator panels.

10. The radiator of claim 1, wherein a chimney is arranged on top of at least some of the radiator panels, comprising an outermost radiator panel wherein the outermost radiator panel is the radiator panel with a greatest distance to the first radiator panel.

11. The radiator of claim 1, wherein a chimney is arranged on top of at least 50% of the radiator panels.

12. The radiator of claim 1, wherein the radiator is for an oil-filled transformer, and wherein the radiator comprises an oil supply duct for supplying oil to be cooled from the transformer to the radiator, and an oil return duct for returning cooled oil from the radiator to the transformer.

13. Transformer comprising at least one radiator comprising a plurality of radiator panels with at least a first radiator panel and a second radiator panel, the first and the second radiator panels extending in a substantially vertical direction, and each of the plurality of radiator panels having a bottom edge, the first and the second radiator panels forming an air duct providing a gap there-between having a width of smaller than 90 mm, and the bottom edge of the first radiator panel being located at a lower vertical height position than the bottom edge of the second radiator panel;

the first radiator panel being located at a side of the radiator that is adapted to be attached to a transformer in such a manner that the first radiator panel and a side of the transformer form a transformer air duct;

and each radiator panel of the plurality of radiator panels having a horizontal depth of at least 8 times the width of the air duct.

14. The transformer claim 13, wherein a height of the radiator panel that is located closest to a side wall of the transformer is substantially equal to a height of the transformer and wherein the radiator panel top edges are located at substantially a same vertical height position.

15. The transformer of claim 13, wherein a height of the radiator panel that is located closest to a side wall of the transformer is substantially equal to a height of the transformer.

16. The transformer of claim 13, wherein, when the radiator is attached to the transformer, the first radiator panel and a side of the transformer form a transformer air duct.

17. The transformer of claim 13, wherein the radiator panel bottom edges of at least three consecutive radiator panels form a line that is in average monotonically ascending with respect to a horizontal in a direction from the first radiator panel to the second radiator panel, the at least three consecutive radiator panels comprising the first and the second radiator panels.

18. The transformer of claim 17, wherein the radiator panel bottom edges of the at least three consecutive radiator panels form a straight line that is monotonically ascending with respect to the horizontal in a direction from the first radiator panel to the second radiator panel.

19. The transformer of claim 13, wherein the vertical height position of the radiator panel bottom edges increases monotonically with respect to a horizontal in a direction from the first radiator panel to the second radiator panel.

20. The transformer of claim 13, wherein the radiator panel top edges are located at substantially a same vertical height position.

* * * * *